Feb. 21, 1967  E. W. KAISER  3,304,954
HOUSING DUCT FOR UTILITY DEVICES
Filed Aug. 13, 1963  3 Sheets-Sheet 1

Inventor
Edward W. Kaiser
By
Mr. F. Kellogg.
Atty.

Feb. 21, 1967  E. W. KAISER  3,304,954
HOUSING DUCT FOR UTILITY DEVICES
Filed Aug. 13, 1963  3 Sheets-Sheet 2
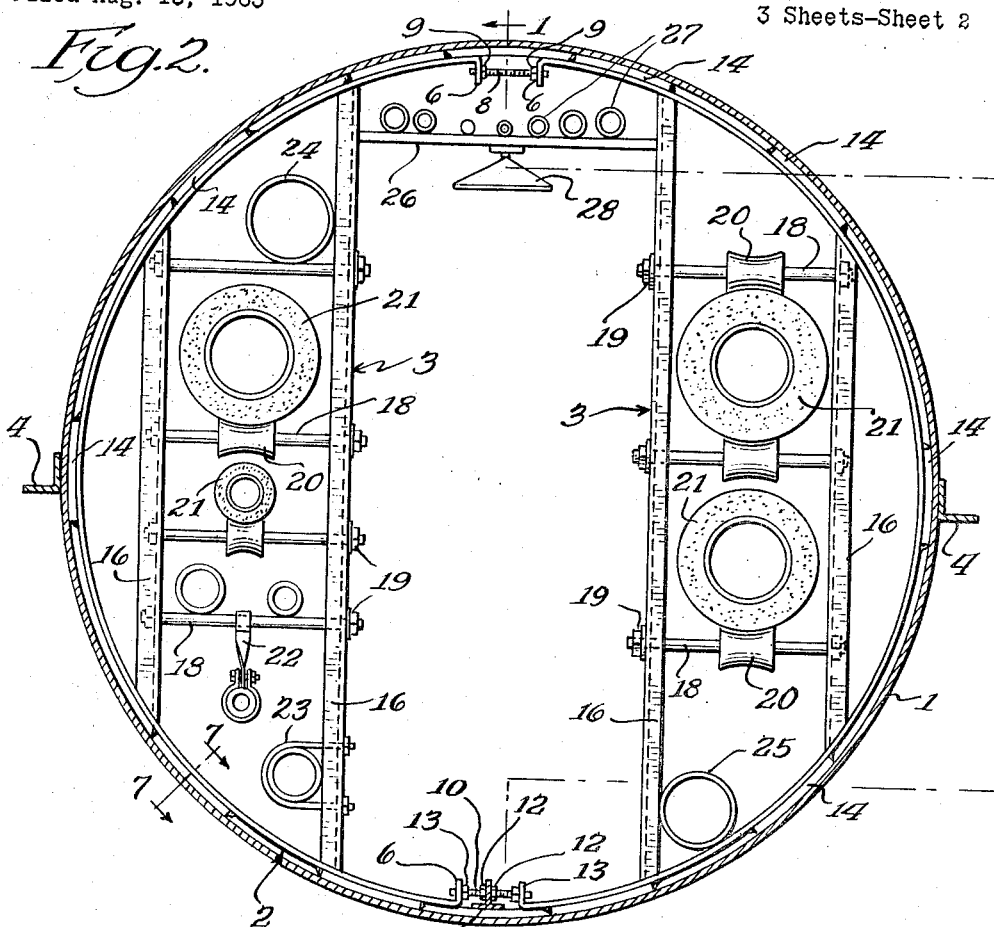
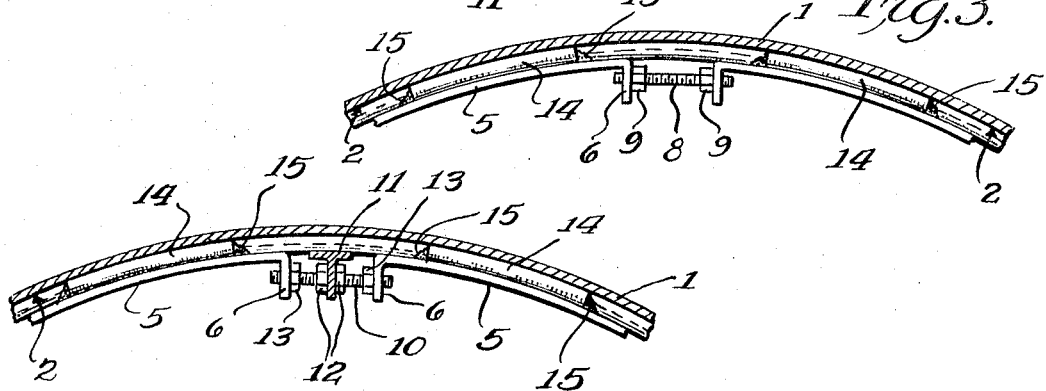
Inventor
Edward W. Kaiser
By
W. F. Kellogg
Atty.

Feb. 21, 1967 E. W. KAISER 3,304,954
HOUSING DUCT FOR UTILITY DEVICES
Filed Aug. 13, 1963
3 Sheets-Sheet 3
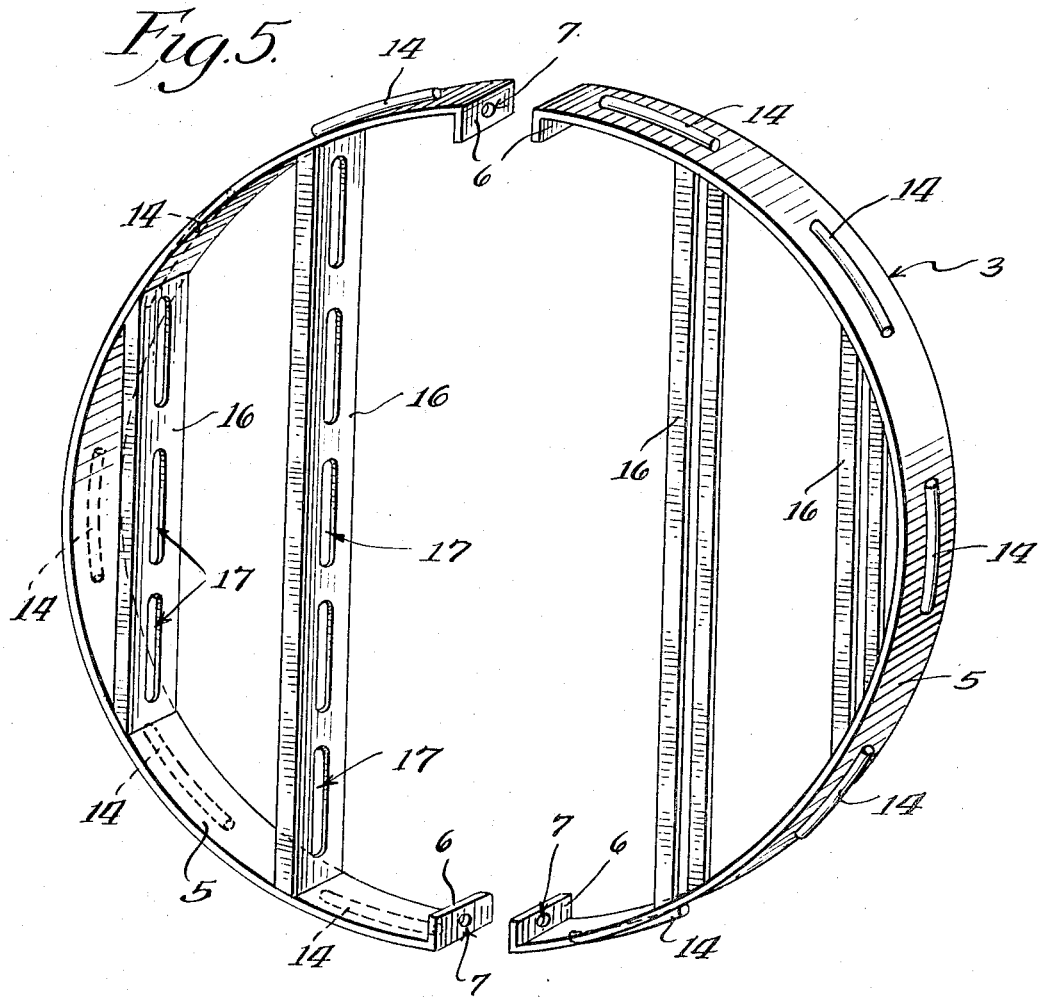
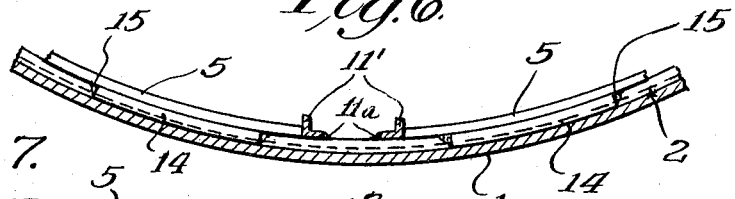
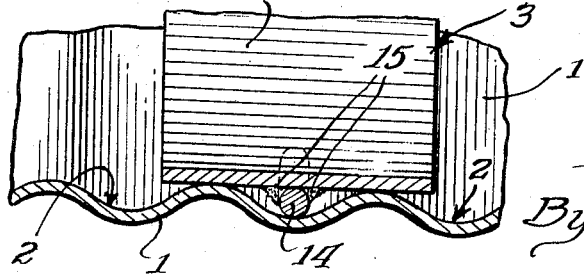
Inventor
Edward W. Kaiser
By M. F. Kellogg
Atty.

United States Patent Office 3,304,954
Patented Feb. 21, 1967

3,304,954
HOUSING DUCT FOR UTILITY DEVICES
Edward W. Kaiser, 2011 W. Arthur,
Chicago, Ill. 60645
Filed Aug. 13, 1963, Ser. No. 301,760
1 Claim. (Cl. 138—112)

This invention relates to improvements in so-called walk-through tunnels or ducts for housing and supporting therewithin conduits, pipes, cables (electric and other) and other utilitarian devices.

It is an object of the invention to provide a construction of the above indicated character into which conduits, pipes, cables (electric or other) and/or substantially any characters or types of utilitarian devices can be entered and effectively supported therein with a minimum of labor and time expenditure.

Another object of the invention is to provide a housing tunnel or duct which may be installed either above or below ground or water surface, permitting convenient and rapid access to be had to the interior thereof for installation, placement or replacement and supporting of various types of utilitarian devices therein; removed therefrom for inspection and/or repair thereof, or the adding of other devices to those already housed and supported therein.

A further object of the invention is to provide a housing tunnel wherein conduits, pipes, cables and other types of utilitarian devices will be firmly and securely supported therein, protected and preserved in satisfactorily operative condition for and over long periods of time.

Yet another object of the invention is to provide a housing tunnel which will afford workers entering thereinto with ample and safe work area or space, hence, effective access to utility devices received and supported therein.

A still further object of the invention is to provide a walk-through tunnel which is beneficially novel and unique in construction, particularly to the extent that the conduit, pipe, cable or other utilitarian device supports received and retained therein will function in a dual capacity, first, to effectively and securely support such devices, and second, to internally brace and/or reinforce the tunnel casing, enabling it to successfully and surely withstand externally applied load, shock or stress, especially as and when it is installed in areas (subterranean or submarine) from or over which great loads and pressures are generated and transmitted thereto, to-wit, under roadways, railway tracks, large buildings, water, etc.

Other and no less important objects of the invention reside in providing a prefabricated walk-through tunnel which can be economically produced, easily, economically and readily prepared for transportation from a point of its production to a place or site of assembly and installation, and there, rapidly and securely assembled by installing labor for use below or above ground or water surface in and with a relative minimum of time and effort.

The foregoing, as well as other objects, advantages and meritorious teachings of my invention will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

In the drawings:

FIGURE 2 is a transverse section taken on the line 2—2 of FIGURE 1, looking in the direction in which the arrows point.

FIGURE 3 is an enlarged fragmentary detail in transverse section through the duct showing, in elevation, one form of means for interconnecting the ends of the arcuate bands of the combined duct reinforcing and utility device supporting members or bodies.

FIGURE 4 is a similar view of a modified form of the arcuate band interconnecting means.

FIGURE 5 is a perspective view of one of the duct reinforcing and utility device supporting bodies or members.

Figure 1:
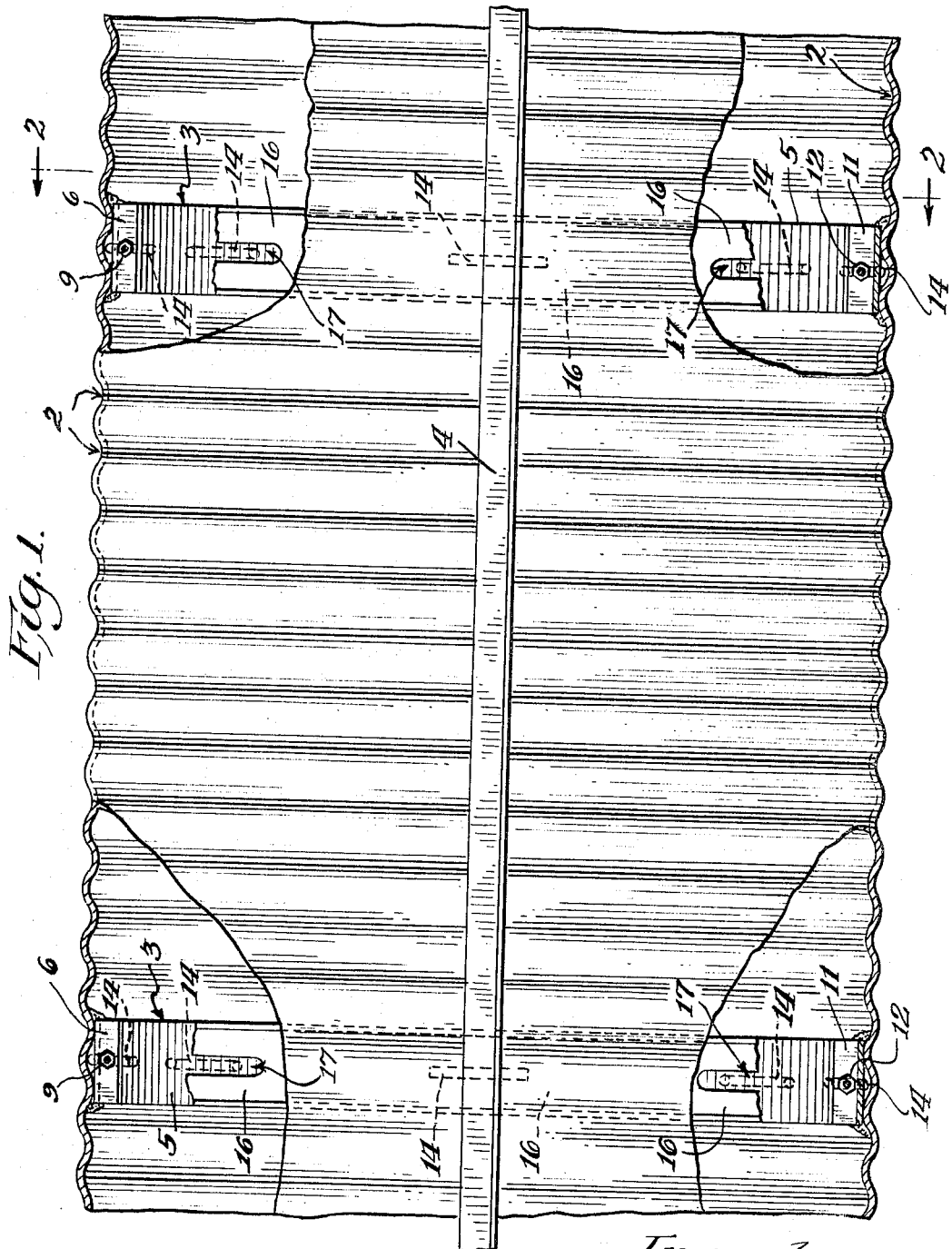
FIGURE 1 is a view partially in side elevation and partially in section, taken on the line 1—1 of FIGURE 2, looking in the direction in which the arrows point, of a duct or tunnel constructed in accordance with my invention.

FIGURE 6 is an enlarged fragmentary detail in transverse section through the duct showing a form of duct anchored stop means for engagement by and with the normally lower ends of the arcuate bands of the duct reinforcing and supporting members, and FIGURE 1 is an enlarged fragmentary detail in section, taken on the line 7—7 of FIGURE 2, showing the character of engagement or interengagement between one of said arcuate bands and the corrugated duct casing.

Referring in detail to the drawings, the invention generally comprises a duct or tunnel casing 1 of circular or other appropriate cross-sectional shape, preferably made of cast iron, sheet or plate steel of adequate gauge in predetermined or required lengths, the latter two embodiments being formed with transversely disposed and body encompassing corrugations, identified at 2, and relatively longitudinally spaced combined reinforcing-utility devices (conduits, pipes, cables, etc.) supporting members 3 received and anchored therein transversely of its longitudinal axis, as shown in FIGURE 1. Said members are of shape and size substantially corresponding to the internal area of the duct or tunnel casing. In assembled or installed relation thereto, they are in contact with the inner sides of the walls thereof.

If desired, external reinforcing angle bars 4, or their equivalents, may be disposed longitudinally of the sides of the assembled and interconnected duct or tunnel casing sections and connected thereto by welding or the like.

It will also be understood and appreciated that the cross-sectional sizes of the ducts or tunnel casings may be varied, such as conditions or requirements of use shall dictate, though they shall preferably be such as will permit ample room for ingress and egress thereinto and therefrom, and walking travel therein and therethrough; being what is characterized in the industry as a walk-through tunnel.

Operative installations of the invention are effected to any desired or required length by arranging a plurality of the ducts or tunnel casings in juxtaposed coaxial relation, then securely interconnecting the same by the use of coupling sleeves or other means (not shown) which are conventional, well known and long used in the art, hence, form no part of my inventive concept.

The reinforcing-supporting members 3 are shown in the present embodiment of the invention to be circular in shape, as is the duct or tunnel casing 1. However, this shape is not to be regarded as restrictive of the inventive concept in any sense. Their shape can and will vary according to the shape of a duct or tunnel casing interior. By the same token, the size thereof will correspond substantially to such interior, this to the extent that they will be arranged or lie in bodily contact or engagement with the walls thereof, as shown in FIGURES 3, 4, 6 and 7 of the drawings.

As hereinbefore stated a plurality of the reinforcing-supporting members 3 may be, and usually are, used in a duct or tunnel casing. Being of like construction and form, but one thereof will be hereinafter described.

Said reinforcing-supporting member consists of complemental arcuate bands 5, preferably made of steel or a material possessed of the required strength and rigidity, yet with a degree of inherent spring property. They are arranged in coplanar endwise opposed relation (see FIGURE 5) thus forming an annular body, having their opposite ends formed with inwardly disposed or extending lips 6, apertured at 7.

To interconnect the bands and cause outward or radial thrust to be imparted thereto, at times, different forms of connectors may be employed.

As shown in FIGURE 2, the opposed upper lipped ends 6 of the bands have a bolt 8 engaged through their respective apertures. Jam or thrust effecting nuts 9 are engaged with the opposite end portions of the bolt and, respectively, have bearing engagement on and with the adjacent band lips 6. Thus, with turning of said nuts outwardly on the bolt, outward thrust and movement will be transmitted to the bands.

The lower opposed lipped ends 6 of the bands are similarly connected by a bolt 10 engaged through a T-shaped bar 11 welded or otherwise permanently connected to the bottom of the tunnel casing longitudinally thereof between said ends and locked thereto by opposed nuts 12. Jam or thrust imparting nuts 13 are threadedly engaged with the transversely extended end portions of the bolt and have bearing engagement with adjacent portions of said lipped ends. Thereby, it will be seen that, first, the bands 5 will be prevented from having rotative shifting movement with relation to the tunnel casing, and second, they will be thrust outwardly into and secured in engagement and bearing contact with adjacent portions of the tunnel casing.

To prevent shifting of the supporting bands longitudinally of the tunnel casing, the outer sides thereof have longitudinally disposed rods or tongues 14 welded or otherwise permanently connected thereto, in spaced relation, as at 15. The cross-sectional shapes and sizes of said rods or tongues are such that they will enter into adjacent corrugations of the tunnel casing, as seen in FIGURE 7 of the drawings, thereby effecting positive anchoring or interengagement between the bands and the tunnel casing.

Should it be desired or required, the form of connection between the upper spaced ends of the bands 5 of the reinforcing-supporting members 3, hereinbefore described, may replace the bolt 8 and the jam nuts 9, as shown in FIGURE 4, thereby further ensuring prevention of rotative shifting thereof.

Instead of the form of connection between the lower lipped opposite ends 6 of the reinforcing-supporting member bands 5, as shown in FIGURE 2, relatively spaced longitudinally disposed angle bars 11' may be welded, as at 11a, to portions of the bottom of the tunnel casing, as shown in FIGURE 6 of the drawings. In such an embodiment, the lower and opposed ends of the bands may be without the lipped portions 6, if it is so desired. The said lower ends of the bands, normally, are in abutting engagement with the adjacent sides or portions of the angle bars 11', hence, are afforded positive stops whereby to prevent their rotative shifting movement within the tunnel casing 1.

Each of the opposed interconnected arcuate bands 5 of the reinforcing-supporting members 3 have normally vertically disposed relatively spaced and parallel stanchions 16, preferably formed of channel metal of appropriate gauge, permanently mounted therein spanning their respective chords (see FIGURES 2 and 5). Relatively equispaced slots or ways 17 are formed in and longitudinally of each stanchion permitting of vertical adjustment of the opposite end portions of normally horizontal support rods 18 therein. Nuts 19 are threadedly engaged with the outer ends of each support rod whereby to fixedly connect the same to their respective stanchions. Cable, conduit or pipe receiving and cradling rollers 20 are, preferably, mounted on intermediate portions of the rods, serving to receive and afford adequate and movable support for and to utilitarian devices, generally indicated by the numeral 21. Other than the rollers 20, hanger and/or clamp brackets 22 and 23, or the like, can be attached to and supported by the rods and stanchions (see FIGURE 2). Furthermore, said rods and stanchions can be employed advantageously to receive and support additional or other utilitarian devices, as indicated by the reference numbers 24 and 25, such as conditions or preference may dictate.

The spacing between the normally vertically disposed pairs of stanchions 16, as shown in FIGURES 2 and 5 of the drawings, is such as will afford or provide ample "walk-through" area or space whereby to permit workers within the tunnel casing to traverse the same and to engage themselves in such labors as are incident to the installation, inspection, repair, etc., of utilitarian devices received and supported within the tunnel.

Should it be desired, the pairs of relatively transversely opposite stanchions 16 may be braced and/or reinforced by the placement and securing of one or more transversely disposed struts 26 therebetween, preferably, in proximity to their upper ends. Such struts will not only brace or reinforce, as above, but will afford additional utilitarian device supporting means, capable of receiving cables, conduits, pipes, etc., generally identified by the numeral 27. Also, if desired, illumination may be provided to the interior of the tunnel by mounting reflector electric lamps, indicated at 28, on the or one of the struts 26.

Because of the construction and the positioning of the reinforcing-supporting members 3 within the tunnel casing 1, it will be understood that said casing will be effectively braced or reinforced to successfully withstand compressive or crush loads such as may be applied thereto during and throughout its period of usage; utilitarian devices received within the tunnel casing and supported by said members will be effectively housed, protected and preserved over long periods of time, will be capable of longitudinal movement to an extent whch will compensate for their expansion and/or contraction, and will afford ample ingress and/or egress thereinto and therefrom to facilitate installation, inspection, repair, replacement, work, etc. Moreover, the reinforcing-supporting members, being prevented from having rotative and/or longitudnial shifting movement within the tunnel casing, will assure satisfactory housing and supporting of utilitarian devices thereon over and for prolonged and/or indefinite periods of time.

It will, of course, be understood by workers skilled in the art, that the number of reinforcing-supporting members employed within a length or section of duct and/or tunnel casing will be commensurate with and capable of withstanding compressive, crush or other normal or abnormal stresses imparted thereto.

In certain types of installations of my invention, the arcuate bands 5 of the reinforcing-supporting members 3 within the ducts (conduits) or tunnel casings 1 may be connected thereto by bolting, welding or other acceptable and appropriate securing means. Such connections may augment that connection effected by the hereinbefore described interengagement between the arcuate band carried rods or tongues 14 and adjacent corrugations 2 of the ducts or casings 1, or may be employed when said ducts or casings are constructed of cast iron and have substantially smooth inner surfaces.

It will also be understood that whereas I have herein referred to the ducts (conduits) or casings as "walk-through," their cross sectional shapes and sizes may be varied—this without limiting or restricting, in any manner, the scope of my invention.

I claim:

A prefabricated walk-through duct comprising in combination:

(a) a length of preformed circumferentially-corrugated duct;

(b) a plurality of sectional circular bands in spaced relation within the duct, each adjustable in diameter for bracing and supporting engagement with the inner sides of said duct and each adjustably connected at certain of their adjacent ends to the duct;
(c) relatively spaced pairs of stanchions spanning the circular bands connected at their opposite ends to adjacent portions of said bands; and
(d) relatively vertically spaced horizontally disposed struts between the stanchions and connected thereto for vertical adjustment therealong;
(e) solid tongues circumferentially disposed about and secured to the outer peripheries of said bands and engaged in certain of the corrugations of said duct to thereby prevent longitudinal shifting of said bands.

References Cited by the Examiner

UNITED STATES PATENTS

| 1,317,495 | 9/1919 | Hessel | 138—105 |
| 2,148,783 | 2/1939 | Spaulding | 61—45 |
| 2,750,749 | 6/1956 | Brown et al. | 138—108 |

FOREIGN PATENTS

| 1,007,713 | 5/1957 | Germany. |
| 267,494 | 9/1929 | Italy. |

LAVERNE D. GEIGER, *Primary Examiner.*

H. ARTIS, *Assistant Examiner.*